United States Patent Office 3,159,915
Patented Dec. 8, 1964

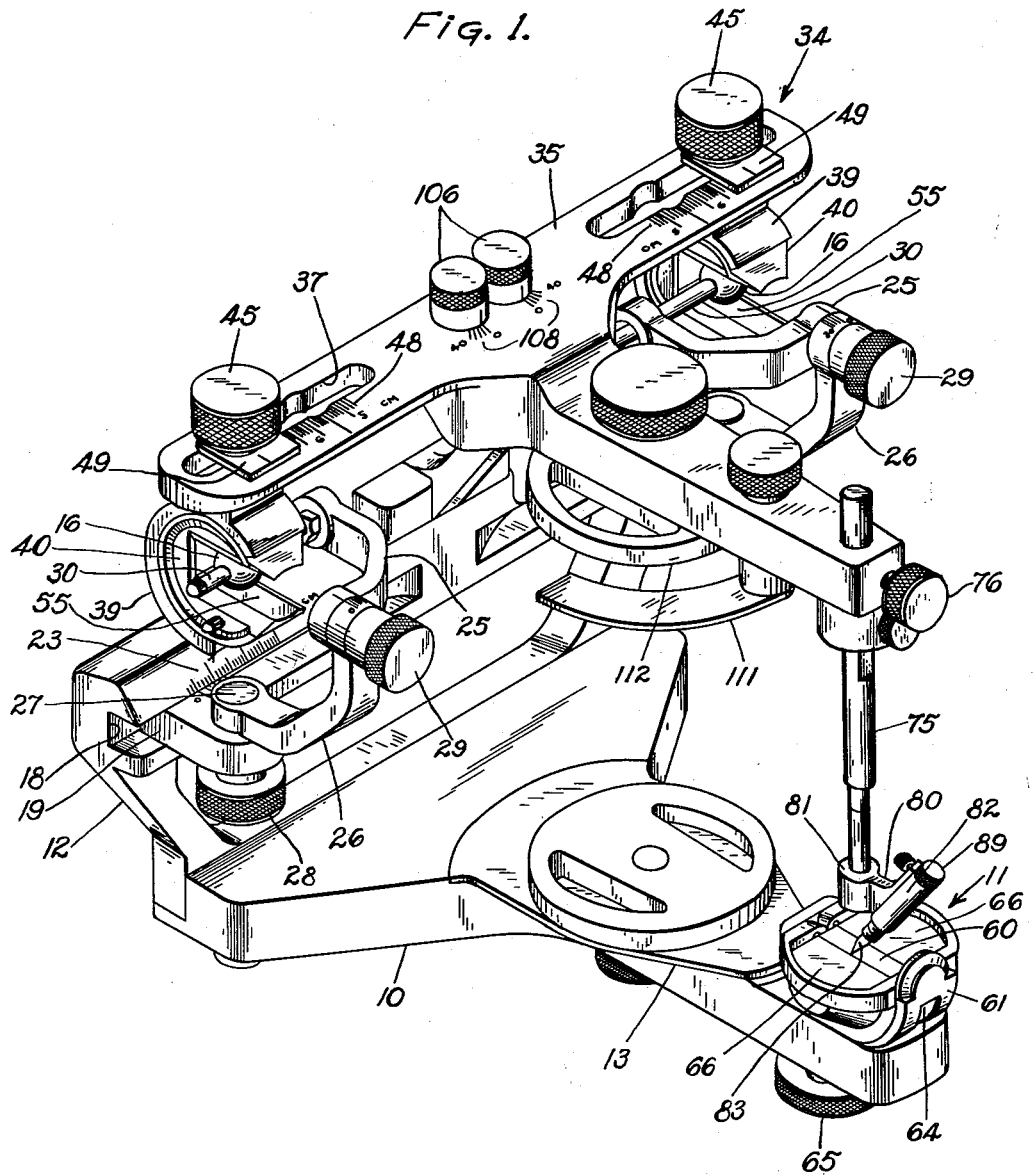

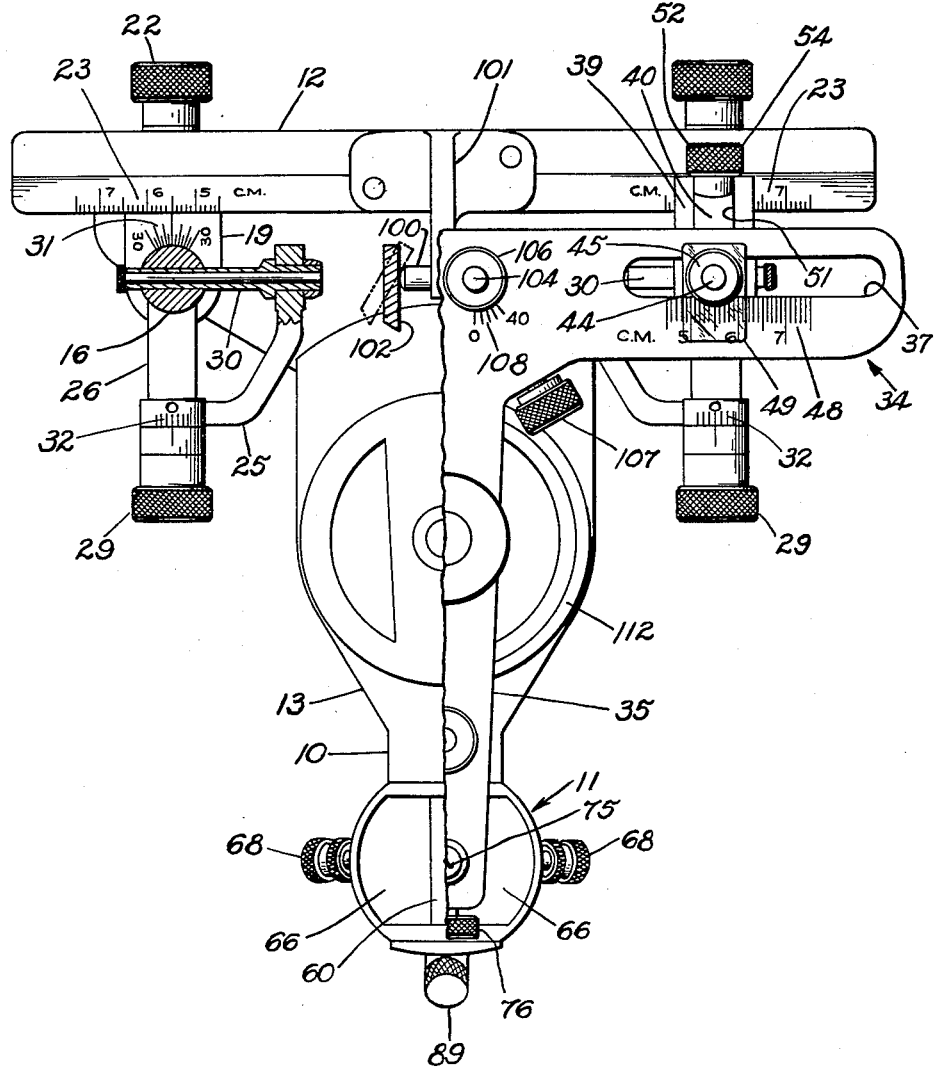

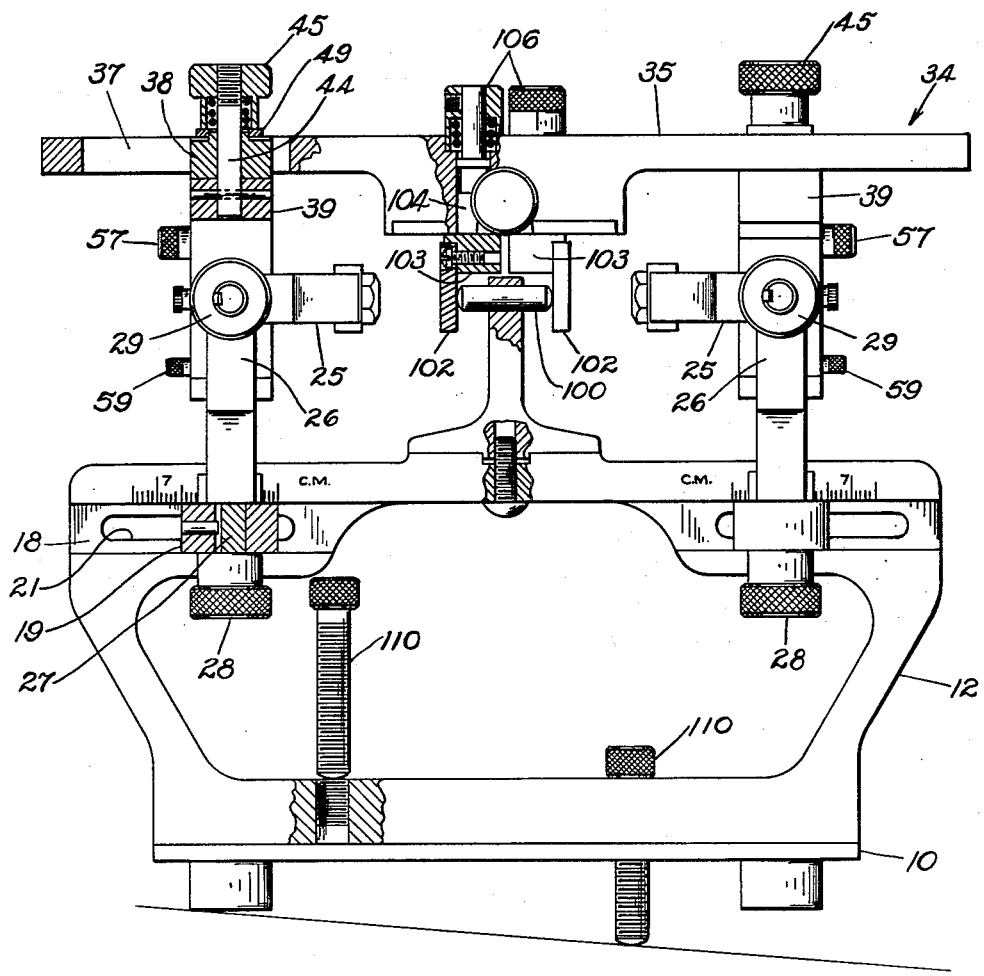

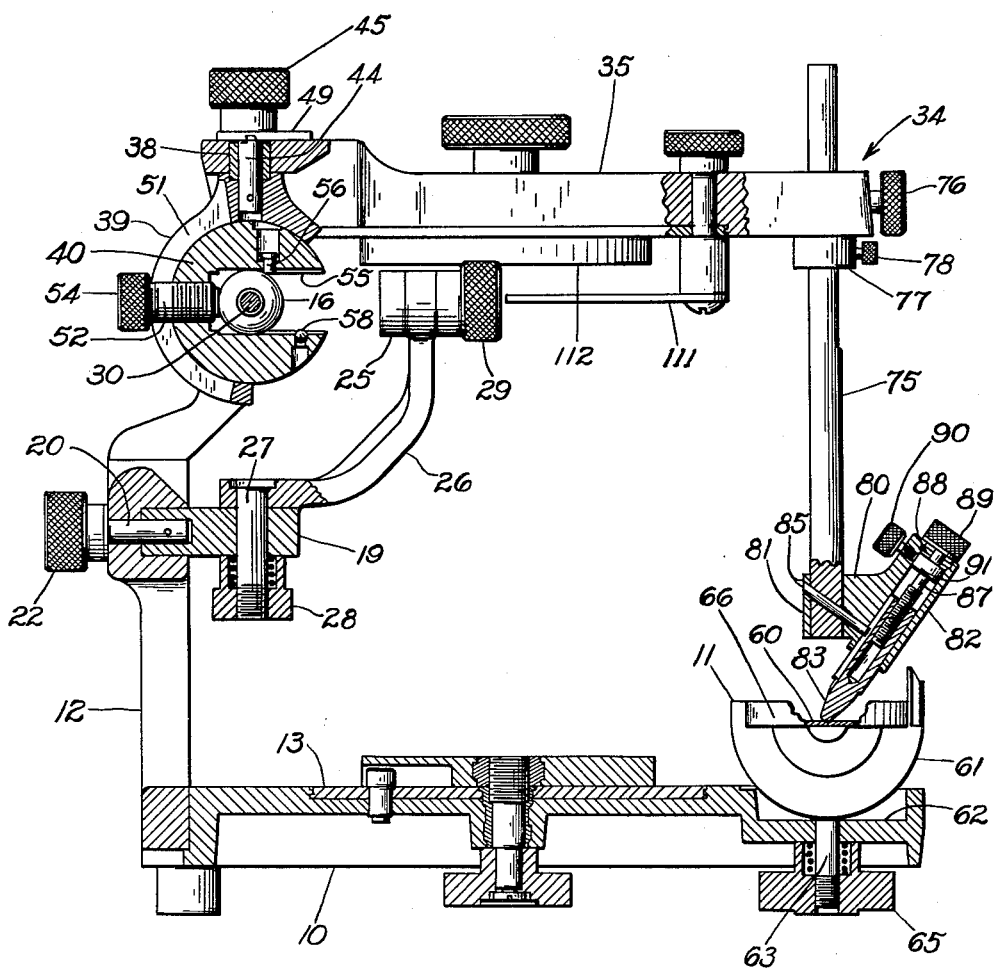

3,159,915
DENTAL ARTICULATOR
Richard A. Beu, Eggertsville, and James H. Janik, Buffalo, N.Y., assignors to Hanau Engineering Company, Inc., Buffalo, N.Y.
Filed Nov. 23, 1962, Ser. No. 239,704
9 Claims. (Cl. 32—32)

This invention relates to dental articulators which are commonly employed in the art of dental prosthesis and the correction of occlusion of natural dentition to produce an accurate simulation of the various movements of a patient's jaw and thereby reproduce the positional relationship of a patient's teeth under various conditions.

Dental articulators are well known mechanisms and those known to the prior art fall into two general classes. In the earliest and best known of these classes the mechanism for simulating the pivotal action of the human jaw comprises condylar balls attached to the upper movable member of the articulator and condylar guidance slots which receive and guide the balls and are associated with the lower member. This is a reversal of the actual anatomical arrangement wherein the maxillary ridges furnish guidance to condylar formations on the mandible of the patient but this reverse arrangement has been resorted to for reasons of mechanical convenience. However, articulators of this general type involve certain compromises from the standpoint of the actual kinetics of the relative movements of the mandible relative to the maxilla.

In the second class of dental articulators the condylar balls are mounted upon the lower mandibular member as in the human jaw and the condylar guidances are provided by slots associated with the upper maxillary member. However, in articulators of this class presently known to the art the true kinetic relationship of the mandible and maxilla are achieved only by rather cumbersome and awkward mechanical arrangements which are difficult or inconvenient to set up and use and which do not provide adequate and rigid mechanical support for the related parts. Furthermore, setting up and adjusting instruments of this class presently known to the dental arts is difficult and certain essential relationships cannot be established and maintained in a certain and accurate manner.

In the articulator of the present invention the condylar balls are correctly associated with the mandibular lower member and coact with slot formations in condylar discs carried by the upper maxillary member. While this mechanical relationship is not new in dental articulators it is achieved in the articulator of the present invention in a novel mechanical structure which is rigid and sturdy and relatively compact. Furthermore, the numerous positional adjustments of the parts which are necessary for establishing the proper kinetic relationships for accurate simulation of a given set of anatomical and dental conditions is achieved in a novel manner and in a structural embodiment which is superior to those heretofore available to the dental arts.

A further important advantage of the condylar ball mounting and adjusting structure of the present invention resides in the fact that the condylar ball mounting shafts are supported for universal angular adjustment by means which in no wise interfere with normal use, operation and adjustment of the instrument. More particularly, despite the provision which is made in the structure for supporting the condylar ball shafts rigidly but for free universal positional adjustment, the condylar discs are freely accessible at the sides of the instrument for observation, adjustment, calibration and other necessary attentions and incidents arising in the use of an instrument of this type.

Adjustments and calibrations of the instrument of the present invention are such that accurate centric articulation and conditions of protrusion and lateral excursions may be produced and, by making proper records of readily ascertainable calibrated settings, may readily be reproduced.

In addition to the novel mechanical articulation arrangement referred to above the articulator of the present invention provides a novel incisal guide structure, particularly with respect to the incisal pin element thereof and the manner in which such incisal pin is arranged for height adjustment. Incisal guide arrangements of the prior art are subject to inherent geometrical inaccuracies owing to undesirable and unnatural variations in the effective radius of articulation of the lower end of the incisal guide pin when the latter is adjusted to suit varying conditions.

A further feature of the articulator of the present invention resides in the provision, in conjunction with the maxilla-mandible articulation and guidance mechanism, of a central guide surface arrangement for lateral guidance of the upper member of the articulator in lateral excursion thereof in conjunction with the vertical guidance movements of the incisal guide. In the present invention such means comprise lateral guide plates which are carried by but disposed beneath the upper member and supported by vertical rotatable pins which are readily adjusted angularly from the top of the articulator by simple calibrated rotational movement.

The lateral guidance wings depend from the upper maxillary member and a cooperating central pin is supported to be disposed between the guidance wings by a bracket extending upwardly from the frame of the lower mandibular member. This pin is provided with spherical lateral end faces the centers of the spherical faces being coincident with centers of rotatable adjustment of the wing members.

The lateral guidance arrangement of the present invention is such that the respective cooperating parts on the upper and lower members of the articulator automatically assume their proper respective positions for performing the lateral guidance function merely by assembling the condylar balls of the lower member with respect to the condylar guidance slots of the upper member without the necessity for assembling or interconnecting the separate parts associated with the lateral guidance elements. Conversely, removal of the upper member of the articulator from the lower member is accomplished without any need for attention to the lateral guidance means since the guidance plates carried by the upper member merely move away from their positions at opposite sides of the central pin which comprises the guidance element carried by the lower member when the condylar joints are disassembled incident to removal of the upper member of the articulator from the lower member.

Various other advantages and novel principles of dental articulator construction will appear to those skilled in the present art from a study of the embodiment illustrated in the drawings and described in the following specification. Furthermore, various structural and operational advantages will be alluded to and discussed in conjunction with the ensuing detailed specification.

A single complete working embodiment of the principles of the present invention is illustrated in the accompanying drawings and described in detail in the following specification. It is to be understood, however, that such embodiment is by way of example only and that numerous mechanical modifications may be made without departing from the principles of the invention, the scope of which is limited only as defined in the appended claims.

In the drawings:

FIG. 1 is a general isometric view of one form of the dental articulator of the present invention;

FIG. 2 is a top plan view of the articulator illustrated in FIG. 1 with the left hand portion of the upper member thereof broken away for added illustration;

FIG. 3 is a front elevational view of the structure of FIGS. 1 and 2 with portions thereof shown in cross section; and FIG. 4 is a side elevational view, likewise with portions thereof shown in cross section.

Like characters of reference denote like parts throughout the several figures of the drawings and, referring first generally to FIG. 1, the articulator illustrated therein comprises a generally T-shaped base member 10 having at its forward end an incisal guide structure indicated generally by the reference numeral 11 and having fixed to its rear edge a generally upstanding frame member 12.

Medially between the forwardly disposed incisal guide and the rear frame member 12, base 10 is provided with a plate 13 which receives a mandibular model in a manner well known to those familiar with dental prosthetics.

The upstanding frame member 12 provides adjustable support for means for simulating the condylar movements of the human jaw in the various movements of the mandible thereof relative to the maxilla. To this end the members which simulate the condylar joints are adjustable to reproduce the various physical conformations of patients such as the lateral spacing of the condylar bearing surfaces and other measurements and proportions such as are usually determined in the first instance by the face bow method or otherwise. Furthermore, means are provided to reproduce the infinite variety of protrusive and lateral excursion movements which are produced by relative movements of the condylar surfaces in the articulation of the jaws of patients.

Referring first to this condylar simulating structure in general terms, a pair of condylar balls 16 are mounted on frame member 12 in such a way that they may be accurately adjusted for lateral spacing in centric position and to dispose their mounting axes in any desired angular direction in setting up the instrument so that the condylar balls may move along such axes during relative lateral excursion movements of the parts of the articulator. However, when a given setup is attained, and excepting for the lateral movements just mentioned, the condylar balls 16 normally remain spatially fixed relative to the lower frame member 12, whereby the balls 16, the frame member 12, the base 10 and the incisal guide 11, considered as a unit, represent the mandible of a patient.

The specific means by which the condylar balls 16 are thus adjustably mounted upon the frame member 12 provide a structurally rigid, conveniently adjustable and mechanically relatively simple physical arrangement of parts which will now be described. Since the condylar ball mountings are identical but opposite a description of one will suffice for both. Frame member 12 is provided with a pair of laterally spaced, forwardly directed horizontally extending tracks or channel formations 18 which receive the rear ends of a pair of bearing blocks 19 which are adjustable positionable along the channel formations and held securely therein in adjusted position by virtue of studs 20 which project rearwardly from the bearing blocks 19 through slots 21 in frame member 12 and are engaged by thumb nuts 22.

As best shown in FIG. 2, an inclined portion of frame member 12 is graduated as indicated at 23 in terms of centimeter distances from the center of the instrument whereby the spacing of the center of each bearing block 19 from a central plane may be independently determined and readily set and locked by means of the thumb nuts 22.

Each condylar ball 16 is mounted upon one of the bearing blocks 19 for universal adjustment of the axis of the ball both vertically and horizontally by means of cooperating upper and lower quadrant arms 25 and 26. It is to be understood that the adjustment of the axis of mounting of each condylar ball is not concerned with rotational movement of the ball but determines the direction of lateral movement of the ball during lateral excursional movements of the parts.

The lower ends of the lower quadrant arms 26 are pivoted to the bearing blocks 19 for adjustable pivotal movement on vertical axes by means of pivot pins 27 and are retained in adjusted pivotal position by thumb nuts 28. The upper end of each lower quadrant arm 26 is attached to a forward end of the corresponding upper quadrant arm 25 for relative pivotal adjustment about a horizontal axis which is coincident with the horizontal axis of condylar ball 16 when the latter is in centric position, as appears clearly in FIG. 4. The arms 25 and 26 are secured in desired relative pivotal positions on such horizontal axes by thumb nuts 29.

The rear end of each of the upper quadrant arms 25 carries shaft 30 which in the zero or starting position of the instrument wherein the parts are in centric and symmetrical adjustment, extends generally horizontal outwardly from arm 25 and passes centrally through a condyle ball 16 whereby the latter is supported by shaft 30 for free sliding movement axially therealong.

It will be noted in FIG. 2 that angular graduations 31 on each bearing block 19 provide a direct numerical reading of the angular extent of shaft 30 with respect to a vertical transverse plane extending through the condylar balls 16 when the latter are in centric position. Similarly, angular graduations 32 at the forward ends of upper quadrant arms 25 give a direct numerical reading of the angular extent of the axis of each shaft 30 with respect to a horizontal plane. Thus any given settings of the shafts 30 may be recorded and accurately be reproduced on future occasions.

Reference will now be had to the upper structure of the instrument which simulates the maxilla of the patient and which engages and is guided by the condyle balls 16 in such manner that relative pivotal and lateral movements of the upper and lower portions of the structure as determined by interengagement of the condyle balls and cooperating bearing surfaces on the upper structure simulate the relative movements of the mandible and maxilla of a patient and reproduce the condylar guidance movements which in the human jaw result from the interaction between the mandibular condyle formations and the maxillary ridge.

The upper maxilla-simulating structure is designated generally by the reference numeral 34 and comprises a generally T-shaped frame member 35 which overlies the base member 10. The rear portion of upper frame member 35 which comprises the crossbar of the T extends laterally to generally overlie frame member 12 and is longitudinally slotted as at 37 to receive slide bearing block portions 38 (see FIG. 3) of a pair of depending arcuate members 39 (best shown in FIGS. 1 and 4) which support a pair of condyle bearing discs 40.

The structural relationship between the upper frame member 35, the slide bearings 38, the arcuate members 39 and the condyle bearing discs 40 is such that the latter, which are angularly adjustable about their common axis and as to their spacing from a plane through the center of the instrument, are held in coaxial relationship along an axis extending parallel to the rear portion of the upper frame member 35. This is in consonance with the relatively fixed relationship between the maxillary ridges of a patient.

As best shown in FIGS. 3 and 4, a pin 44 is fixed in each of the arcuate members 39 and extends upwardly through the slide bearing portion 38 thereof, the latter seating in a groove in the upper surface of member 39 to hold the parts against relative rotation. A thumb screw 45 engages the threaded upper end of pin 44 to lock the member 39 and bearing portion 38 securely against movement along slot 37.

As shown at the right hand side of FIG. 2, the upper surface of frame member 35 is graduated as at 48 to indicate distances from the central plane of the upper frame member 35 in centimeters. A transparent plate 49 overlies bearing portion 38 and has a tongue and slot connection therewith to prevent rotation of plate 49, the latter having an indicating hairline whereby each arcuate member 39 may be accurately positioned a predetermined distance laterally from the central plane of frame member 35. Normally the lateral positioning of the arcuate members 39 will coincide with the lateral positions of the vertical pivot axes of the structure which supports the condyle balls 16, that is, the pivot pins 27.

Referring particularly to FIG. 4, each of the arcuate members 39 is circumferentially slotted as at 51 and a stud 52 which is threaded into the associated condyle bearing disc 40 passes through the slot 51 and fits closely therein to prevent relative movement of disc 40 in an axial direction relative to its supporting arcuate member 39. The outer end of stud 52 is separately threaded to receive a thumb nut 54. When the latter is loosened disc 40 may be adjusted rotatably in its supporting arcuate member 39 and when the thumb nut is tightened rotatable adjustment is maintained. The marginal edges of each member 39 may be graduated in degrees to give an accurate measurement of the angular relationship or position of disc 40 relative to the member 39. This angle of adjustment establishes the angle of extent of the path of condylar guidance, as will presently appear.

As shown in FIGS. 1 and 4, each condyle bearing disc 40 has a radial slot 55 extending inwardly from the forward edge thereof to a point substantially rearwardly of the center thereof. The upper and lower surfaces of each slot 55 are concavedly arcuate to receive a condyle ball 16 therein and retain the same against displacement in a direction laterally of the instrument, that is, in the direction of the axis of condyle bearing disc 40. Thus the surfaces of the slots 55 of the condyle discs 40 guide the condyle balls 16 in substantially the same manner that the maxillary ridges of the maxilla guide the condylar formations of the mandible, the slots 55 and the condyle balls 16 forming a mechanical counterpart of the anatomical articulation of the human jaw.

The portions of studs 52 which are in threaded engagement with the bearing discs 40 as shown in FIG. 4 are normally so adjusted that their right hand end surfaces, as viewed in FIG. 4, serve as stops for the condyle balls 16 which locate the same in centric position wherein they are concentric with the discs 40.

A pin designated 56 in FIG. 4 may be held in the position illustrated in FIG. 4 which locks the condyle ball in centric position. To effect this centric lock a screw 57 in each condyle disc 40 (see FIG. 3) has a conical inner end which wedges against the head of pin 56 to cam the latter into the centric lock position illustrated in FIG. 4. Withdrawing movement of screw 57 permits the ball 16 to push the pin 56 upwardly and thus permits free protrusive movement and the necessary movement of ball 16 in slot 55 under conditions of lateral excursion.

A further stop device is provided which prevents the condyle balls from moving entirely out of the slots 55 unless disassembly of the upper and lower members of the articulator is desired. A detent ball 58 adjacent to the outer end of each slot 55 as shown in FIG. 4 is held in the stop or retaining position, when desired, by a screw 59, see FIG. 3, which has a pointed or conical end adapted to bear against the ball 58 and hold the same in the locking position.

Reference will now be had to the incisal guide portion of the apparatus of the present invention which has previously been generally identified generally by the reference numeral 11. In this connection reference will be had particularly to FIGS. 1 and 4. The lower or table portion of the incisal guide structure, that is, the guide surface per se, is mounted upon the forward end of base member 10 and is generally similar to the incisal guide structure which is illustrated and described in detail in Franwick Patent No. 3,035,350.

As to structural details not fully illustrated in FIGS. 1, 2 and 4 reference may be had to the aforesaid Franwick patent since the lower or guiding surface portion of the incisal guide arrangement of the present invention substantially duplicates the corresponding structure of the aforesaid patent and is not novel to the articulator of the present invention.

The central or principal incisal guide surface portion is designated 60 and has a semi-circular lower portion 61 best shown in FIG. 4 which is rockably adjusted in a recess 62 in the forward portion of base member 10 whereby the incisal guide 60 is adjusted about a lateral horizontal axis extending through the guide surface. A T-bolt 63 engages a peripheral slot 64 in the semi-circular lower portion 61 of the incisal guide to retain the same in the recess 62 and a thumb screw 65 may be tightened to secure the incisal guide in desired adjusted angular position.

Lateral wing members 66 for providing incisal guidance in cases of lateral excursion are pivoted to the opposite side edges of incisal guide 60 for pivotal adjustment about axes extending coincident with the side edges of the incisal guide surface 60 and the wing members 66 are pivotally raised and lowered by adjusting screws designated 68 in FIG. 2 in a manner shown in detail in the aforesaid Franwick Patent No. 3,035,350.

The novelty of the present invention with respect to the incisal guide structure resides particularly in the incisal guide pin and the manner in which the same is related to the incisal guide surface, more particularly as concerns vertical adjustment of the incisal guide pin in a manner which renders the lower end guiding surface of the pin in proper relationship to the guide surface despite adjustments of the lower end of the pin with accompanying relative condylar pivotal movements of the upper and lower members of the articulator.

In conventional incisal guide pin arrangements vertical adjustment of the incisal guide pin is effected by merely shifting the pin vertically in its upper end bearing in the front end of the upper member of the articulator and such adjustment alters the distance from the condylar centers to the point of guiding contact of the guide pin on the incisal guide, that is, it alters the effective radius of the arc of movement of the lower end of the incisal guide pin with respect to the condylar centers.

Stated another way, the distance from the condylar centers to the incisal guide pin bearing at the front of the upper member 35 is relatively constant and may be considered as one side of a right triangle. If then the second side of the right triangle, the distance from the bearing at the upper end of the incisal guide pin to its lower end, is altered by vertical adjustment of the guide pin in the upper bearing thereof, then the hypotenuse of the triangle, from the condylar centers to the lower end of the incisal guide pins is likewise altered. This source of inaccuracy is merely tolerated in conventional articulators.

The present articulator construction corrects this condition of maladjustment by providing a generally up and down adjustment of the lower operative portion of the incisal guide pin along a line which, viewed from the side of the instrument, extends generally tangent to an arc struck from the condylar centers. Thus, the distance from the condylar centers to the point of engagement of the guide pin with the incisal guide remains substantially constant in various positions of vertical adjustment of the lower operative end of the incisal guide pin.

Referring particularly to FIG. 4, the incisal guide pin assembly comprises a main supporting pin member 75 which extends vertically through the forward end of the upper frame member 35 in the usual manner and is held in desired vertical position relative to the upper frame member 35 by a thumb screw 76. This adjustment is used in establishing protrusive settings and in locking the incisal guide pin in an entirely withdrawn position relative to the incisal guide as in setting up operations. A further collar 77 which is clamped to pin member 75 by a thumb screw 78 is provided so that pin member 75 may be wholly removed from the articulator in certain phases of use of the articulator by releasing thumb screw 76 and may then be replaced in the same vertical position by inserting pin member 75 upwardly in the bore in the forward end of upper frame member 35 until the collar 77 abuts the under side of frame member 35 as illustrated in FIG. 4.

A bracket 80 has a bearing portion 81 which is fixed to the lower end of the supporting pin member 75 and a further inclined bearing portion 82 which, as indicated above, lies generally along or tangent to an arc struck from the condylar centers in a central fore and aft plane. The incisal guide pin member per se is designated 83 and is disposed for axial sliding movement in bearing portion 82. In the present instance, as shown in FIG. 4, a pin 85 which secures the bracket 80 to the lower end of supporting pin 75 extends into a keyway in guide pin 83 to prevent the latter from rotating.

A captive screw 87 threads into the upper end of guide pin member 83 and is held against axial movement by a snap ring 88. Manipulation of screw 87 by means of head 89 thereof adjusts the guide pin member 83 axially and adjusted position is retained by a set screw 90 which is brought to bear against an enlargement 91 on screw 87.

From the foregoing it will be noted that, as the screw 87 is manipulated to adjust the incisal guide pin 83 to bring it into contact with the incisal guide after proper tooth engagement of the models or dentures has been established, the lower end of the pin 83 will engage the guide 60 centrally, that is, at its axis of rocking adjustment, despite variations in height adjustment as evidenced by variations in the vertical distance from forward end of upper frame 35 to the lower end of guide pin 83.

Reference will now be had to means provided for lateral guidance of the upper member of the articulator in lateral excursion movements, such means serving to guide or define the relative limits of movements of the upper member as to movements in a horizontal plane in conjunction with the vertical guidance provided by the lateral wings of the incisal guide just described. Such lateral guidance means are not broadly new in the present articulator but are so constructed and arranged in the articulator of the present invention as to provide a very direct and certain lateral control in a manner which requires a minimum of manipulative skill, which permits recording the lateral guidance settings for duplication at any future time, and which affords a reliable and secure setting of the lateral guidance parts.

The relatively fixed lateral guidance element which is mounted upon the lower member of the articulator comprises a laterally extending pin 100, best shown in FIGS. 2 and 3, which is carried by a bracket 101 which is attached centrally and extends upwardly from the rear frame member 12. A pair of depending pivotally adjustable plate members 102 lie at opposite sides of pin 100 and in FIG. 3 these guidance plate members are illustrated in their zero positions of adjustment wherein they extend parallel from front to rear of the instrument and thus confine the pin 100 against any lateral movement relative to the upper maxillary member 34.

As best shown in FIG. 3, each lateral guidance plate 102 is fixed to a block 103 formed at the lower end of a shaft 104 which extends vertically and is rotatably mounted in upper frame member 35. Manipulating knobs 106 at the upper ends of the shafts 104 are rotated to adjust the guidance plates 102 to desired angular settings and a pair of set screws, one of which is shown at 107 in FIG. 2, thread into upper frame member 35 and are brought to bear against the shafts 104 to retain them in desired adjusted angular positions.

From the zero positions illustrated in FIG. 3 the guidance plates may be swung to various lateral guidance positions by manipulating the knobs 106 to move the forward ends of the plates 102 outwardly from the central plane of the articulator whereby the plates 102 form an included angle having its apex toward the rear of the instrument. Here again, angular settings of the guidance plates 102 may be calibrated by graduations indicated at 108 in FIG. 2, either in initially setting the instrument for given conditions or for recording and subsequently reproducing given settings.

It will be noted that the central rigid pin 100 has spherical end faces and the arcs defining these end faces are struck from the axes of the shafts 104 about which the plates 102 are adjusted. This tangent engagement between plates 102 and the end of pin 100 prevents lateral movement of the upper member when in centric regardless of angular settings of the plates 102.

In FIG. 3 the numeral 110 designates a pair of jack screws which thread downwardly through the rear portion of base 10 for leveling the instrument and for raising the rear to the level of the face bow pointers in setting up the instrument. An orbital gauge designated 111 in FIGS. 1 and 4 is associated with upper frame member 35 for use in the usual manner to determine the height of the middle of the maxillary arm in fixing the maxillary cast to the holder therefor which is designated 112 in the drawings.

In referring to directions and relative positions of the parts in the foregoing specification and the appended claims reference is to the neutral or zero positions of the parts as illustrated in the drawings, although such positions and directions are subject to various adjustments and variations in setting up and using the instrument.

We claim:

1. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally and rearwardly therefrom, and a pair of condyle ball shafts normally fixed to the opposite ends of said second pair of quadrant arms and extending horizontally therefrom to intersect the axis of the lower quadrant arm vertical pivot, the axial extent of said condyle ball shafts being rendered universally adjustable by adjustment of said vertical and horizontal quadrant arm pivots, condyle balls having central bores bearing on said shaft, and slotted condylar guidance discs carried by said upper member with the condyle balls slidably guided in said slots.

2. In a dental articulator, a base member and an upper member movably supported thereby to simulate the relative maxially-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally and rearwardly therefrom, and a pair of condyle ball shafts normally fixed to the opposite ends of said second pair of quadrant arms and extending horizontally therefrom to intersect the axis of the lower quadrant arm vertical pivot, the axial extent of said condyle ball shafts being rendered universally adjustable by adjustment of said vertical and horizontal quadrant arm pivots, condyle balls having central bores bearing on said shaft, and slotted condylar guidance discs carried by said upper member with the condyle balls slidably guided in said slots, said guidance disc slots being normally disposed in common fore and aft planes with respect to said lower quadrant arm vertical pivots.

3. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally toward said central plane and rearwardly, and a pair of condyle ball shafts normally fixed to the opposite ends of said second pair of quadrant arms and extending horizontally therefrom in a direction away from said central plane, the axial extent of said condyle ball shafts being rendered universally adjustble by adjustment of said vertical and horizontal quadrant arm pivots, condyle balls having central bores bearing on said shaft, and slotted condylar guidance discs carried by said upper member with the condyle balls slidably guided in said slots.

4. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally and rearwardly therefrom, and a pair of condyle ball shafts normally fixed to the opposite ends of said second pair of quadrant arms and extending horizontally therefrom in a direction away from said central plane, the axial extent of said condyle ball shafts being rendered universally adjustable by adjustment of said vertical and horizontal quadrant arm pivots, condyle balls having central bores bearing on said shaft, and condylar guidance means carried by said upper member and bearing on said condyle balls.

5. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes extending laterally toward said central plane and rearwardly, and a pair of condyle ball shafts normally fixed to the opposite ends of said second pair of quadrant arms and extending horizontally therefrom in a direction away from said central plane, the axial extent of said condyle ball shafts being rendered universally adjustable by adjustment of said vertical and horizontal quadrant arm pivots, condyle balls having central bores bearing on said shaft, and condylar guidance means carried by said upper member and bearing on said condyle balls.

6. In a dental articulator, a lower base member and an upper member having connection therewith for pivotal movement about a generally horizontal axis, said upper member having a portion extending generally parallel to said axis and overlying the same, a pair of vertical shaft members extending vertically through said upper member on axes lying at opposite sides of the center thereof, said shaft members having portions extending upwardly from said upper member for manual rotation of said shaft members, depending plate members carried by the lower ends of said shaft members beneath said upper member and positionable by rotational adjustment of said shaft members to form a pair of facing lateral guidance surfaces, and a central abutment member fixed to said lower base member and positioned to lie between said surfaces and contact the same, said abutment member having spherical lateral surfaces with their radii coincident with the axes of said vertical shaft members.

7. In a dental articulator, a lower base member and an upper member having articulating connection therewith for movement about a generally horizontal axis, said upper member having a portion extending generally parallel to said axis and overlying the same, a pair of vertical shaft members extending vertically through said upper member on axes lying at opposite sides of the center thereof, said shaft members having portions extending upwardly from said upper member for manual rotation of said shaft members, depending plate members carried by the lower ends of said shaft members beneath said upper member and positionable by rotational adjustment of said shaft members to form a forwardly facing internal lateral guidance angle, and a central abutment member fixed to said lower base member and positioned to lie in said angle and contact the angle-defining facing surfaces of said depending plate members, said abutment member having spherical lateral surfaces with their radii coincident with the axes of said vertical shaft members.

8. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally and rearwardly therefrom, and a pair of condyle ball shafts normally fixed to the opposite ends of said second pair of quadrant arms and extending horizontally therefrom to intersect the axis of the lower quadrant arm vertical pivot, the axial extent of said condyle ball shafts being rendered universally adjustable by adjustment of said vertical and horizontal quadrant arm pivots, condyle balls having central bores bearing on said shaft, and slotted condylar guidance discs carried by said upper member with the condyle balls slidably guided in said slots, said condylar guidance discs being adjustable along said upper member toward and away from said central plane to effect vertical registry of said slots with said lower quadrant arm vertical pivots.

9. In a dental articulator, a base member and an upper member movably supported thereby to simulate the relative maxillary-mandibular movements of the human jaw, a pair of bearing members supported by said base member for lineal adjustment toward and away from the central plane of the articulator, a pair of first quadrant arms pivoted at their lower ends to said bearing members on vertical axes and extending generally forwardly and upwardly therefrom, a pair of second quadrant arms pivoted at an end of each to the upper end of each first quadrant arm on generally horizontal fore and aft axes and extending laterally and rearwardly therefrom, and a pair of condyle ball shafts normally fixed to the opposite ends of said second pair of quadrant arms and extending horizontally therefrom in a direction away from said central plane, the axial extent of said condyle ball shafts being rendered universally adjustable by adjustment of said vertical and horizontal quadrant arm pivots, condyle balls having central bores bearing on said shaft, and condylar guidance means carried by said upper member and bearing on said condyle balls, said condylar guidance means being adjustable along said upper member toward and away from said central plane to effect vertical registry of said means with said lower quadrant arm vertical pivots.

References Cited by the Examiner

UNITED STATES PATENTS

| | | | |
|---|---|---|---|
| 1,666,022 | 4/28 | Phillips | 32—32 |
| 1,684,393 | 9/28 | Gysi | 32—32 |
| 1,906,797 | 5/33 | Lentz | 32—32 |
| 2,119,896 | 6/38 | Van Dorn et al. | 32—32 |
| 2,788,575 | 4/57 | Needles | 32—32 |
| 2,824,371 | 2/58 | Granger | 32—32 |
| 3,035,350 | 5/62 | Franwick | 32—32 |
| 3,048,923 | 8/62 | Franwick | 32—32 |

RICHARD A. GAUDET, *Primary Examiner.*

ROBERT E. MORGAN, *Examiner.*